United States Patent
Yoshida et al.

[11] Patent Number: 5,979,937
[45] Date of Patent: *Nov. 9, 1999

[54] AIR BAG DEVICE

[75] Inventors: Ryoichi Yoshida; Hiroaki Fujii, both of Echi-gun, Japan

[73] Assignee: Takata Corporation, Shiga, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/833,480

[22] Filed: Apr. 7, 1997

Related U.S. Application Data

[60] Provisional application No. 60/015,015, Apr. 8, 1996.

[51] Int. Cl.$^6$ .................................................. B60R 21/16
[52] U.S. Cl. ........................................ 280/743.2; 280/739
[58] Field of Search ............................ 280/743.1, 743.2, 280/728.1, 729, 739

[56] References Cited

U.S. PATENT DOCUMENTS

| | | | |
|---|---|---|---|
| 3,797,855 | 3/1974 | Wright | 280/150 AB |
| 5,048,863 | 9/1991 | Henseler et al. | 280/743.1 |
| 5,454,595 | 10/1995 | Olson et al. | 280/743.1 |
| 5,584,508 | 12/1996 | Maruyama et al. | 280/743.1 |
| 5,599,040 | 2/1997 | Takahashi et al. | 280/743.1 |
| 5,803,495 | 9/1998 | Jackson et al. | 280/743.1 |

FOREIGN PATENT DOCUMENTS

| | | | |
|---|---|---|---|
| 495409 | 7/1992 | European Pat. Off. | 280/743.1 |
| 0614785A1 | 9/1994 | European Pat. Off. | |
| 2030863 | 6/1970 | Germany | 280/743.1 |
| 3-67748 | 3/1991 | Japan | 280/743.1 |
| 3-136945 | 6/1991 | Japan | 280/743.1 |
| 3-279053 | 12/1991 | Japan | 280/743.2 |
| 4-166453 | 6/1992 | Japan | 280/743.1 |
| 4-221250 | 8/1992 | Japan | 280/743.1 |
| 4-310449 | 11/1992 | Japan | 280/743.2 |
| 2288464 | 10/1995 | United Kingdom | |
| WO96/25309 | 8/1996 | WIPO | |

*Primary Examiner*—Paul N. Dickson
*Attorney, Agent, or Firm*—Foley & Lardner

[57] ABSTRACT

An air bag device includes a second panel that is provided with stitching or adhesive for modulating the unfurling action of an air bag after its peripheral seam comes out of a cover. For example, the second panel is formed with stitched portions or bonded portions, or tethers spanning the second panel are connected to the peripheral seam of the air bag. Further, only a single layer of a first panel of the air bag is disposed between the gas outlets of an igniter and the vehicle occupants. In operation, the peripheral seam of the air bag, when located within the cover, slides along the inner side wall of the cover against the friction therebetween, so that the first panel is slowly unfurled through an opening in the cover. After the peripheral seam of the air bag is ejected out of the cover, the above-indicated stitching or adhesive provided for the second panel is adapted to modulate the unfurling action of the air bag in the lateral direction and toward the vehicle passenger, so that the air bag can be unfurled at a relatively low rate.

7 Claims, 9 Drawing Sheets

AIR BAG DEVICE

This application claims benefit of Provisional Application No. 60/015,015 filed Apr. 8, 1996.

FIELD OF THE INVENTION

The present invention relates to an air bag device, and particularly to an air bag to be installed on the driver's side of a vehicle.

BACKGROUND OF THE INVENTION

An air bag device includes an inflatable air bag that is normally folded, and an igniter for inflating the air bag. In the air bag device for protecting a vehicle occupant in the driver's seat, an inflatable air bag is secured to a mounting positioned in the middle of a steering wheel, and is retained within a cover. Upon collision of the vehicle, gas is generated by the igniter, expanding the air bag. Expansion of the air bag ruptures and spreads the cover, allowing the air bag to be unfurled between the steering wheel and the occupants in the vehicle. It is desirable in the field of air bag devices to modulate the rate at which the air bag expands toward the occupant when the igniter is actuated, rather than allowing unrestrained expansion toward the occupant.

Examples of air bags devices with controlled rates of expansion are disclosed in U.S. Pat. No. 5,393,134 (corresponding to JP-A-6-305388 published in 1994) and U.S. Pat. No. 5,280,954 (corresponding to JP-A-6-234344 published in 1994), wherein first and second panels of the air bag are stitched together, and the stitches or seams thus made are successively torn apart due to the pressure of the gas within the air bag, whereby expansion of the air bag is slowed. Other examples are disclosed in U.S. Pat. No. 5,308,113 (corresponding to JP-A-6-191366 published in 1994), U.S. Pat. No. 5,454,595, and JP-A-6-286543 published in 1994, and others, wherein the first and second panels of the air bag are connected by means of tethers, each of which are shortened by folding. In operation, stitches joining the tether folds are successively torn apart due to the pressure of the gas expanding the air bag, thereby limiting the rate the air bag is expanded. A further example is disclosed in JP-A-6-298025 published in 1994, wherein the first and second panels of the air bag are bonded together by a thermoplastic adhesive, such as a hot melt adhesive or a thermosetting adhesive, which is gradually melted, altered or degraded by the heat of the gas generated by the igniter, thereby limiting the rate the air bag is expanded.

Figure 12:
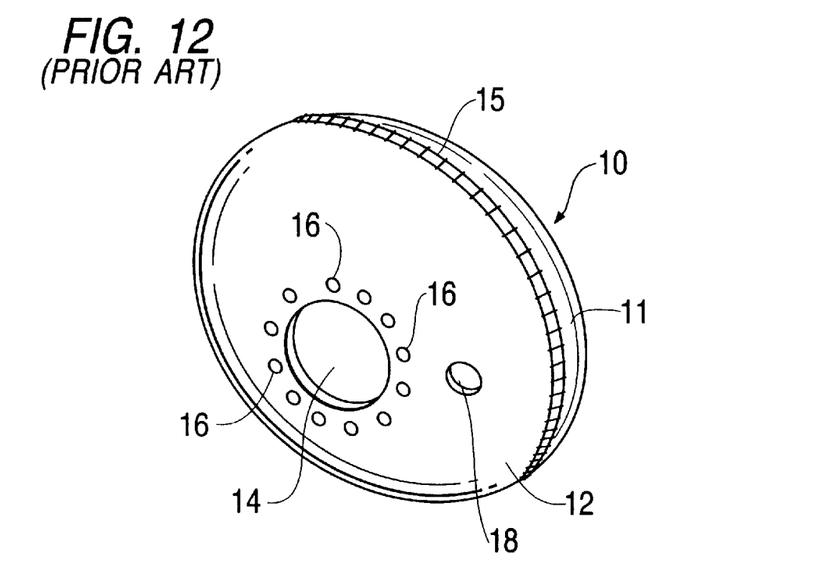
FIG. 12 is a perspective view showing a conventional air bag.
Figure 13:
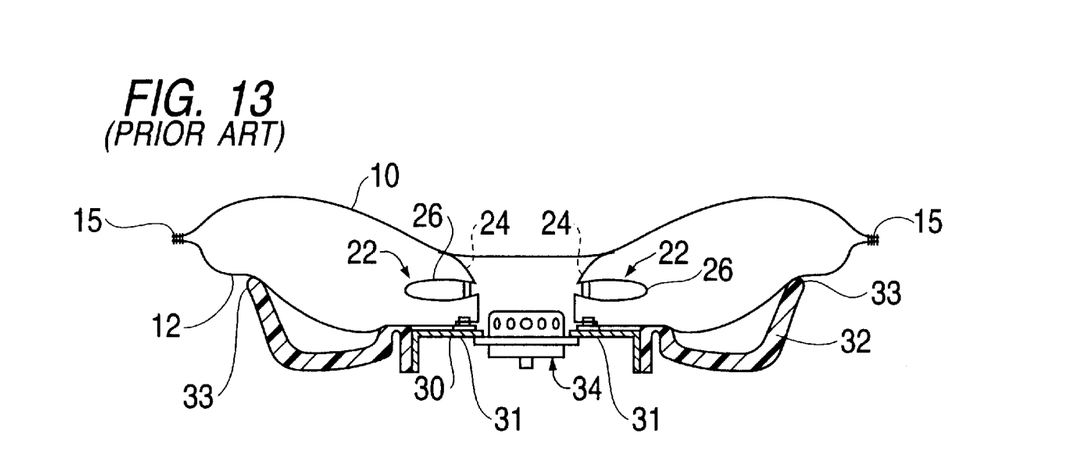
FIG. 13 is a view showing an unfolded state of an air bag of a conventional air bag device.

FIG. 12 is a perspective view showing an inflated state of a known air bag for the driver's seat, and FIG. 13 is a cross sectional view showing tethers, as described above, used in the known air bag device. The air bag 10 shown in FIG. 12 has a first panel 11 and a second panel 12, each consisting of a circular cloth. The panels 11,12 are sewed together at a peripheral seam 15. The second panel 12 has an opening 14 formed in a middle portion thereof, through which an igniter 34 (FIG. 13) extends. Around the opening 14, there are formed holes 16 into which are inserted bolts, pins or rivets 31 used to secure the air bag 10 on a mounting 30 (FIG. 13). The second panel 12 further has a vent hole 18 adapted to release the gas generated by the igniter and stored in the air bag 10.

As shown in FIG. 13, the inflatable air bag 10 is secured by bolts, pins or rivets 31 to the mounting 30, and is retained within a cover 32. The first panel 11 and the second panel 12 are connected to each other, by tethers 22 that are shortened by folding to create tether folds 26. The tether folds 26 are stitched together with sewing threads 24. When the air bag 10 is inflated by gas generated in the igniter 34, the cover 32 is initially ruptured, and a central portion of the first panel 11 is projected outward through an opening 33 of the cover 32 while the peripheral seam 15 of the air bag 10 pushes the cover 32 sideways and progressively opens the cover 32. The air bag 10 is unfurled at a relatively low rate, since the peripheral seam 15 at the maximum diameter of the air bag 10 pushes open the cover 32 while being pressed against the inside wall of the cover 32 until the peripheral seam 15 reaches the opening 33 of the cover 32. Then, the air bag 10 is rapidly unfurled once the peripheral seam 15 of the air bag 10 is ejected out of the opening 33 in the cover 32 since the friction between the peripheral seam 15 and the inside wall of the cover 32 has been eliminated. Thus, the whole air bag 10 is deployed outside the cover 32, as shown in FIG. 13. At this point in time, the air bag 10 is prevented from being pushed toward the occupant (i.e., upward in FIG. 13) because the first and second panels 11,12 are connected by the tethers 22 with the tether folds 26. Thereafter, the gas pressure generated by the igniter 34 is directed at the first panel 11 so as to push the first panel 11 toward the occupant. Subsequently, the sewing threads 24 maintaining the tether folds 26 are broken enabling the tethers 22 to extend to their full length, whereby the first panel 11 is deployed toward the vehicle occupants.

In the air bag having the tethers 22 shown in FIG. 13, and other known air bags in which the front and rear panels are sewn or adhesively bonded to each other, the peripheral seam 15 having the maximum diameter is pressed against the inside of the cover 32 with the resulting friction between the air bag 10 and the inner wall of the cover 32 slowing the rate at which the air bag 10 is unfurled. Once this peripheral seam 15 is ejected outside of the cover 32, however, the resistance to unfurling due to the above-described friction is eliminated, and the remainder of expansion by the air bag 10 is unrestrained, exerting strong tensile forces on local parts of the air bag. Therefore, the panels 11,12 of the air bag 10 are required to have a thickness large enough to resist the localized tensile force.

SUMMARY OF THE INVENTION

It is therefore an object of the present invention to provide an air bag device for a vehicle wherein an air bag is unfurled at a reduced rate in the lateral direction thereof and toward a vehicle occupant, even after its peripheral seam having the maximum diameter is ejected outside a cover. It is another object of the invention to provide such an air bag device as described above, wherein a uniform tensile force is exerted on the air bag during its expansion by reducing the rate or speed at which the air bag is unfurled in the lateral direction and toward the vehicle occupants.

To accomplish the above objects, the second panel of the air bag is provided with means for modulating the unfurling action of the air bag so that the air bag is unfurled at a relatively low rate, even after the peripheral seam of the air bag is outside the normal cover for the inflatable air bag. More specifically, the second panel is formed with stitched or bonded portions, or tethers are provided between the peripheral seam of the air bag and the mounting. Further, only a single layer of the first panel of the air bag is disposed between the igniter and the vehicle occupant. In the operation of the air bag device thus constructed, the peripheral seam of the air bag, when located within the cover, pushes open the cover while sliding along the inner side wall of the cover against the friction therebetween, so that the first panel is slowly unfurled outward through an opening in the cover.

After the peripheral seam of the air bag is ejected outside the cover, the above-indicated means associated with the second panel modulates the unfurling action of the air bag in the lateral direction and toward the vehicle occupant, so that the air bag can be unfurled at a lower rate, thus maintaining a uniform tensile force in the air bag during the unfurling action.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Figure 1:
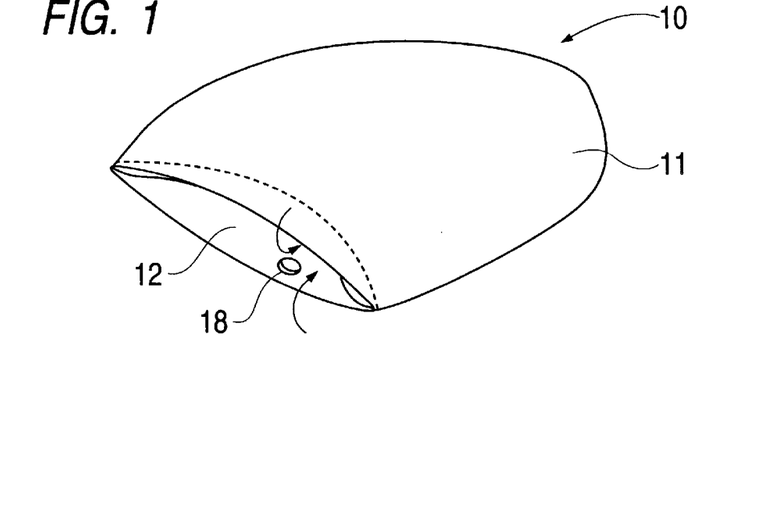
FIG. 1 through FIG. 3 are perspective views showing a process of fabricating an air bag of one embodiment of the present invention.
Figure 2:
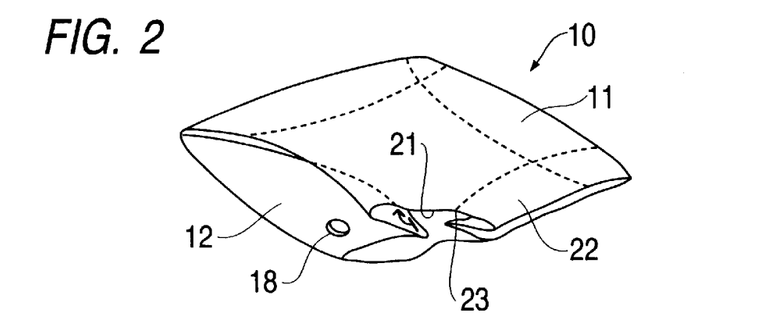
Figure 3:
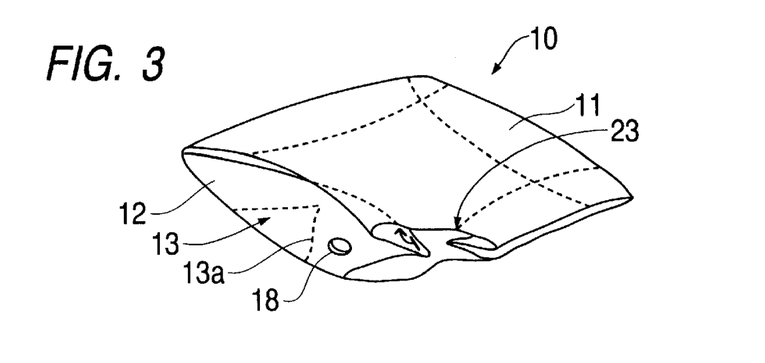

FIG. 1 through FIG. 3 illustrate a process of fabricating an inflatable air bag 10 constructed according to one embodiment of the present invention in which frangible stitching links folds of a second panel 12. The inflatable air bag 10 includes the second panel 12 and a first panel 11, having a front surface 21, a back surface 22 and an edge 23 connecting the front and back surfaces 21,22. The second panel 12 is secured to the back surface 22, such as by sewing, to form a peripheral seam 15 proximate to the edge 23 of the first panel 11. The peripheral seam 15 delimits the interior space between the first and second panels 11,12 of the inflatable air bag 10.

The peripheral seam 15 securing the first and second panels 11,12 may be located in the interior space within the inflatable air bag 10, as in the embodiment of FIG. 1, or located outside the interior space within the inflatable air bag 10, as shown in FIG. 13. With the peripheral seam 15 located outside the interior space, the second panel 12 confronts the back surface 22. The peripheral seam 15 can be located inside the interior space by inverting (i.e. turn inside-out) the inflatable air bag 10 such that the second panel 12 confronts the front surface 21.

Initially, an arcuate part of the inflatable air bag 10 is folded inward, as indicated by an arrow in FIG. 1. The second panel 12 may also be folded inward at a plurality of additional locations. For example, FIG. 2 shows a total of four folds, thereby providing an inflatable air bag 10 having a generally square shape when viewed from above. The broken lines of FIG. 2 indicate the peripheries of the second panel 12 that are folded inside. In FIG. 3, the folds of the second panel 12 that are superposed on each other are sewed together with frangible threads 13a to thus form a stitched portion 13. While the present embodiment has only one stitched portion 13, as shown in FIG. 3, similar stitched portions 13 may be provided in additional folds of the second panel 12.

Figure 4A:
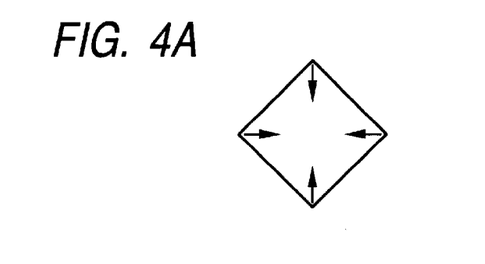
FIGS. 4A, 4B and 5A–5C are views for explaining the process of fabricating the air bag of the above-indicated one embodiment of the invention.
Figure 4B:
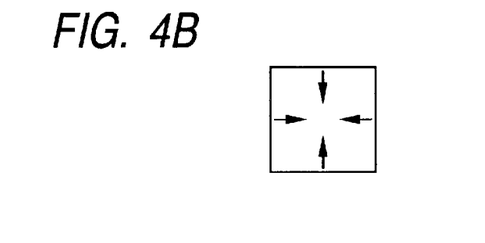
Figure 5A:
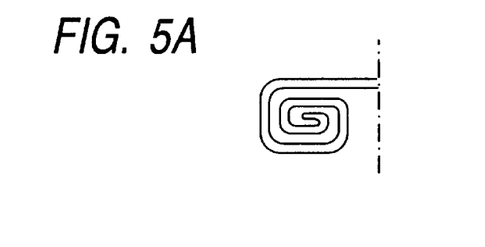
Figure 5B:
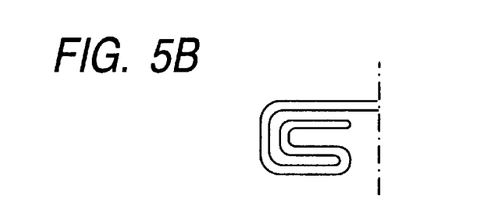
Figure 5C:
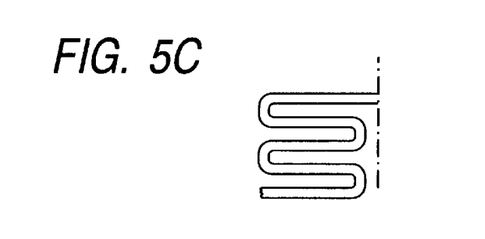

Subsequently, the second panel 12 and rest of the inflatable air bag 10 shown in FIG. 3 may be folded one or more addition times. For example, starting at its four corners as shown in FIG. 4A or its four edges as shown in FIG. 4B, inflatable air bag 10 may be further folded into a compact size to be accommodated in a cover 32. The peripheral seam 15 of the inflatable air bag 10 may be folded up in various manners, such as by rolling (FIG. 5A), rolling and folding in a zigzag (FIG. 5B), or folding in a zigzag fashion (FIG. 5C), so that the inflatable air bag 10 is accommodated in the cover 32.

Figure 6:
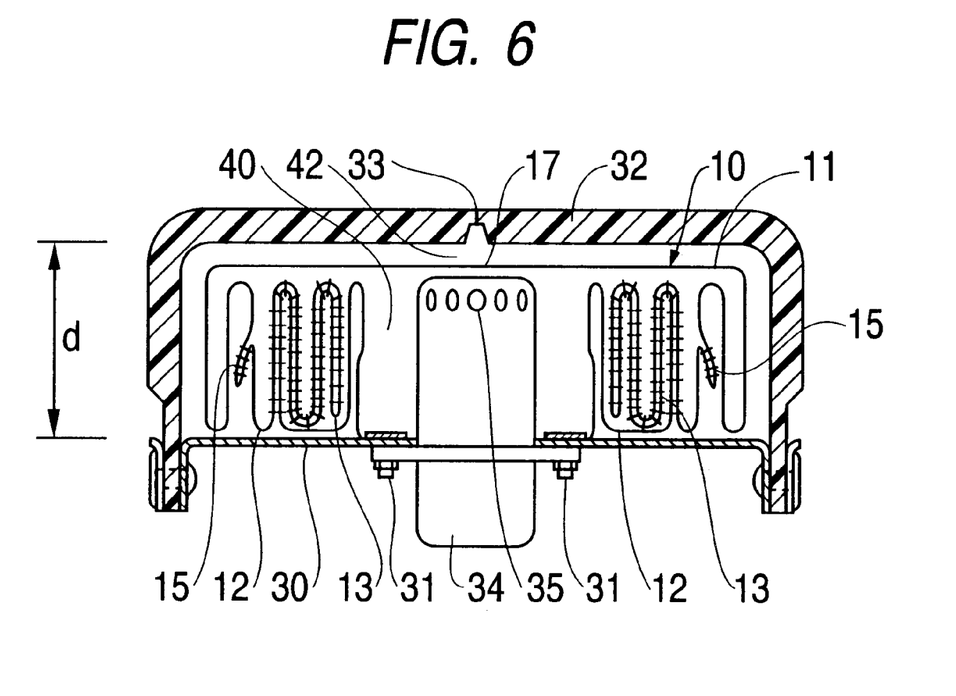
FIG. 6 through FIG. 8 are cross sectional views showing unfolded states of an air bag device constructed according to one embodiment of the present invention.
Figure 7:
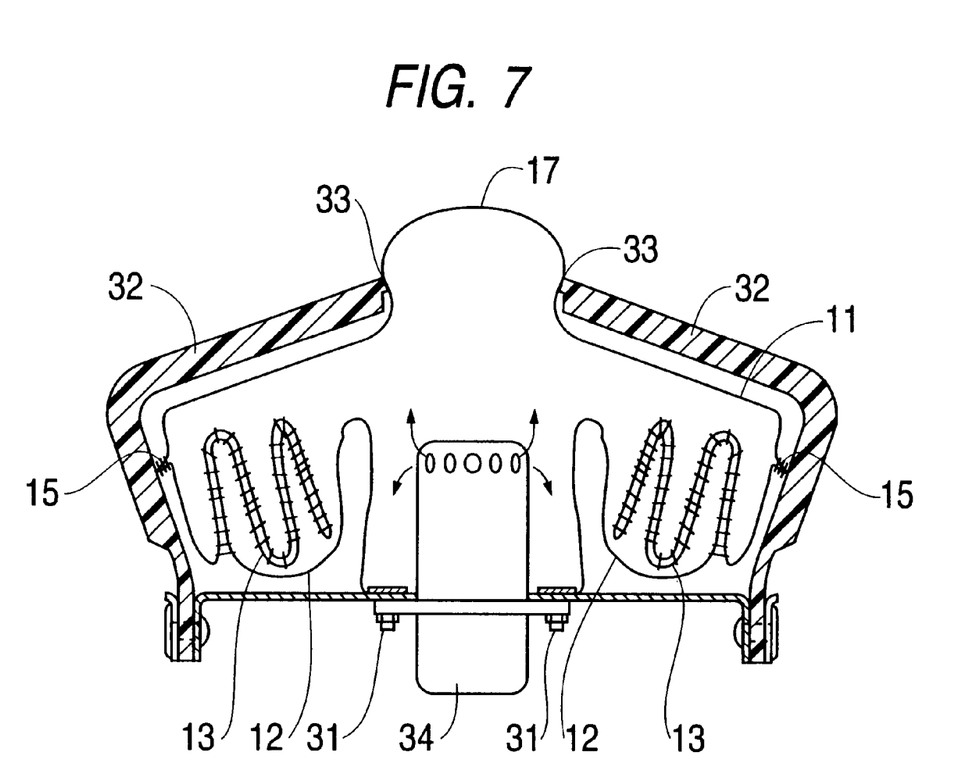
Figure 8:
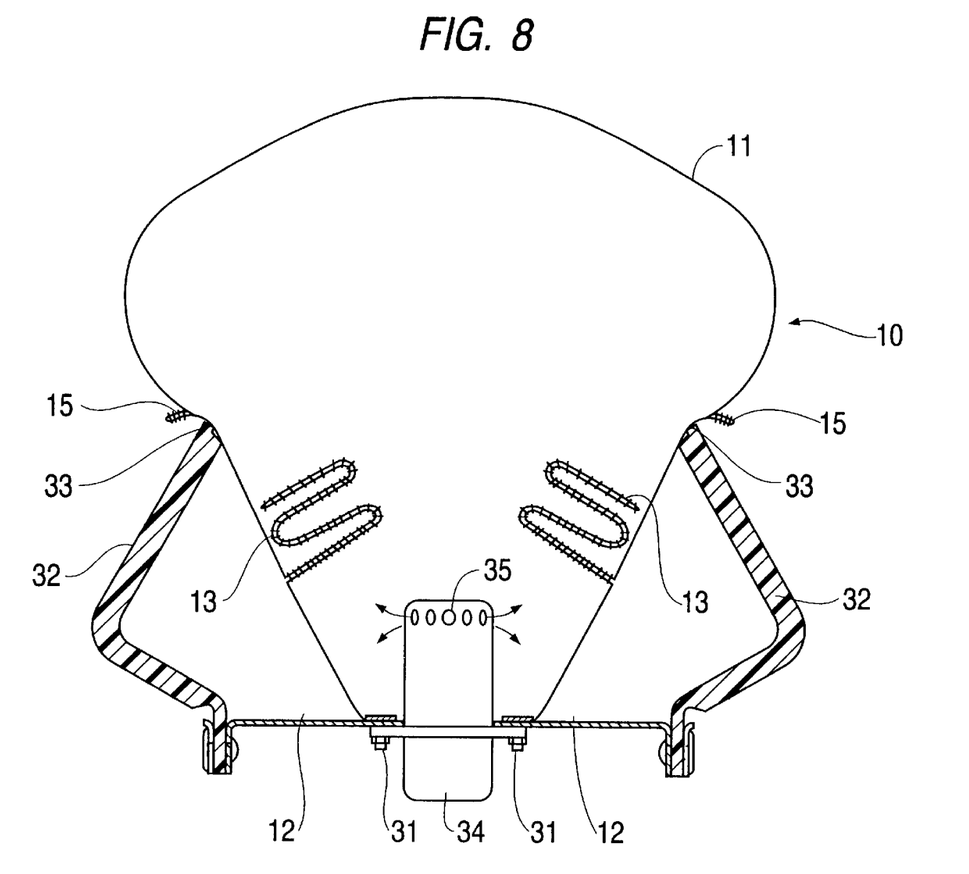

Referring next to FIG. 6 through FIG. 8, the manner in which the inflatable air bag 10 constructed according to the present invention is unfurled with gas generated an igniter 34 is described. FIG. 6 is a cross sectional view showing the first embodiment of the present invention. In this embodiment, the inflatable air bag 10 is formed by sewing the first panel 11 and the second panel 12 to form the peripheral seam 15 outside the interior space of the inflatable air bag 10. The second panel 12 includes superposed folds that are sewed together with frangible threads 13a to form stitched portions 13. Igniter 34 having gas outlet holes 35 is mounted along with the second panel 12 on mounting 30. The cover 32 is also fixed at its perimeter to the mounting 30. The cover 32 is formed to create an opening 33 in the middle thereof. The inflatable air bag 10 is accommodated or retained in a space 40 defined by the igniter 34, mounting 30 and the cover 32. The igniter 34 extends into the space 40 slightly less than the distance "d" between the mounting 30 and the cover 32. A single layer of the first panel 11 is present in a gap 42 defined between the end of the igniter 34 and the cover 32. This arrangement makes it possible to smoothly unfurl the first panel 11 as described later.

FIG. 7 shows an expanding state of the air bag device in which the igniter 34 starts discharging a gaseous fluid through the gas outlet holes 35, as indicated by the arrows. The gas discharge from the igniter 34 causes cover 32 to rupture creating opening 33 in the cover 32, and a middle portion 17 of the first panel 11 starts unfurling or projecting through opening 33, such that the projected part of the first panel 11 assumes an elliptic shape in cross section. During this unfurling action, the peripheral seam 15 of the first and second panels 11,12 is pressed against the inside wall of the cover 32 due to the gas pressure within the air bag 10, while proceeding toward the opening 33 of the cover 32.

FIG. 8 shows a more advanced operating state of the air bag device in which the peripheral seam 15 of the air bag 10 is ejected from the opening 33 of the cover 32. In this state, the frangible stitches 13a formed in the second panel 12 restrain the entire first and second panels 11,12 from popping out or immediately projecting outward. The frangible threads 13a of the stitched portions 13 are then successively broken as the gas pressure created by the inflater 34 increases, whereby the first and second panels 11,12 are progressively unfurled to project outside the cover 32. The unfurling action of the air bag 10 is completed when all the frangible threads 13a are broken.

Figure 9A:
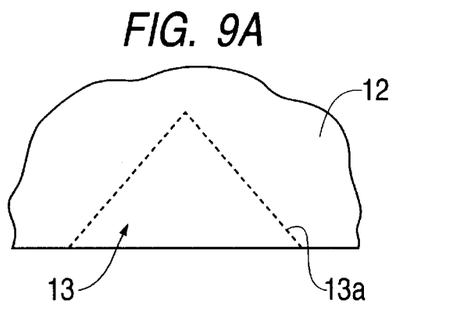
FIGS. 9A–9G are views showing patterns of stitches formed in a rear panel of the air bag device of FIGS. 6–8.
Figure 9B:
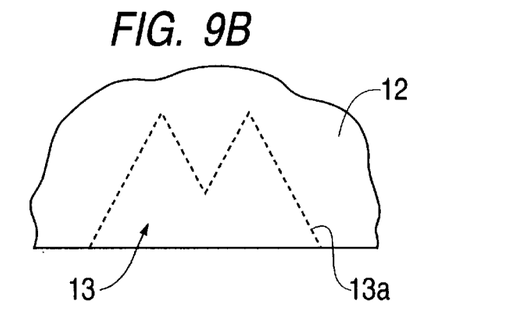
Figure 9C:
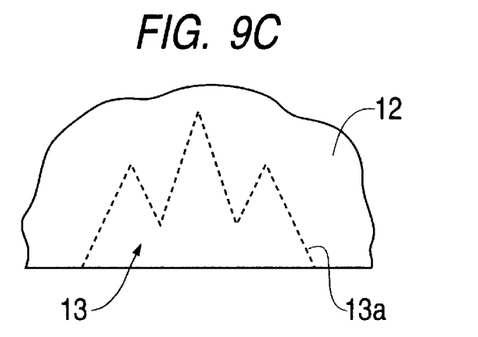
Figure 9D:
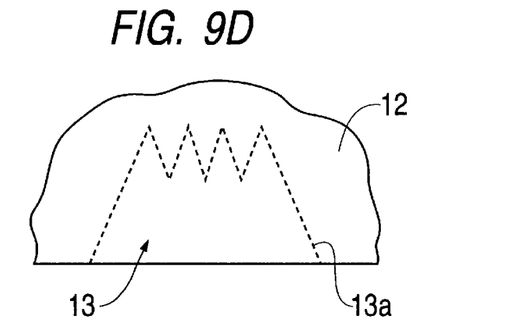
Figure 9E:
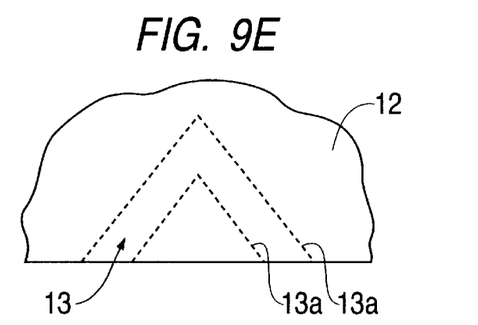
Figure 9F:
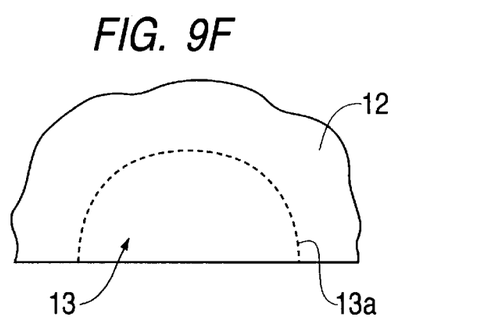

The pattern of stitches formed with the frangible threads 13a at the stitched portions 13 of the folded second panel 12 may be selected from various patterns, such as a mountain-like pattern (FIG. 9A), a two-mountain-like pattern (FIG. 9B), a three-mountain-like pattern (FIG. 9C), a four-mountain-like pattern (FIG. 9D), a double-mountain-like pattern (FIG. 9E), or a semicircular pattern (FIG. 9F).

Figure 9G:
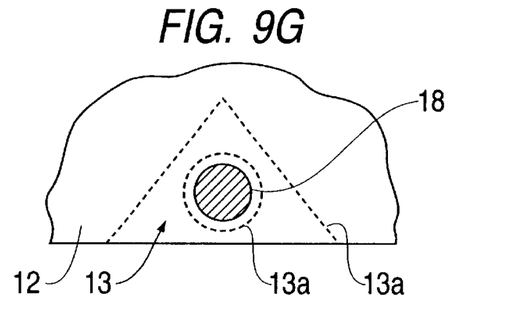

While a vent hole 18 penetrating the second panel 12 is provided outside the stitched portion 13 in the embodiment of FIG. 3, the vent hole 18 may be circumscribed by the frangible threads 13a as shown in FIG. 9G. In this arrangement, gas is prevented from being discharged through the vent hole 18 while the first panel 11 is unfurled, thus efficiently making use of the gas generated by the igniter 34.

Figure 10:
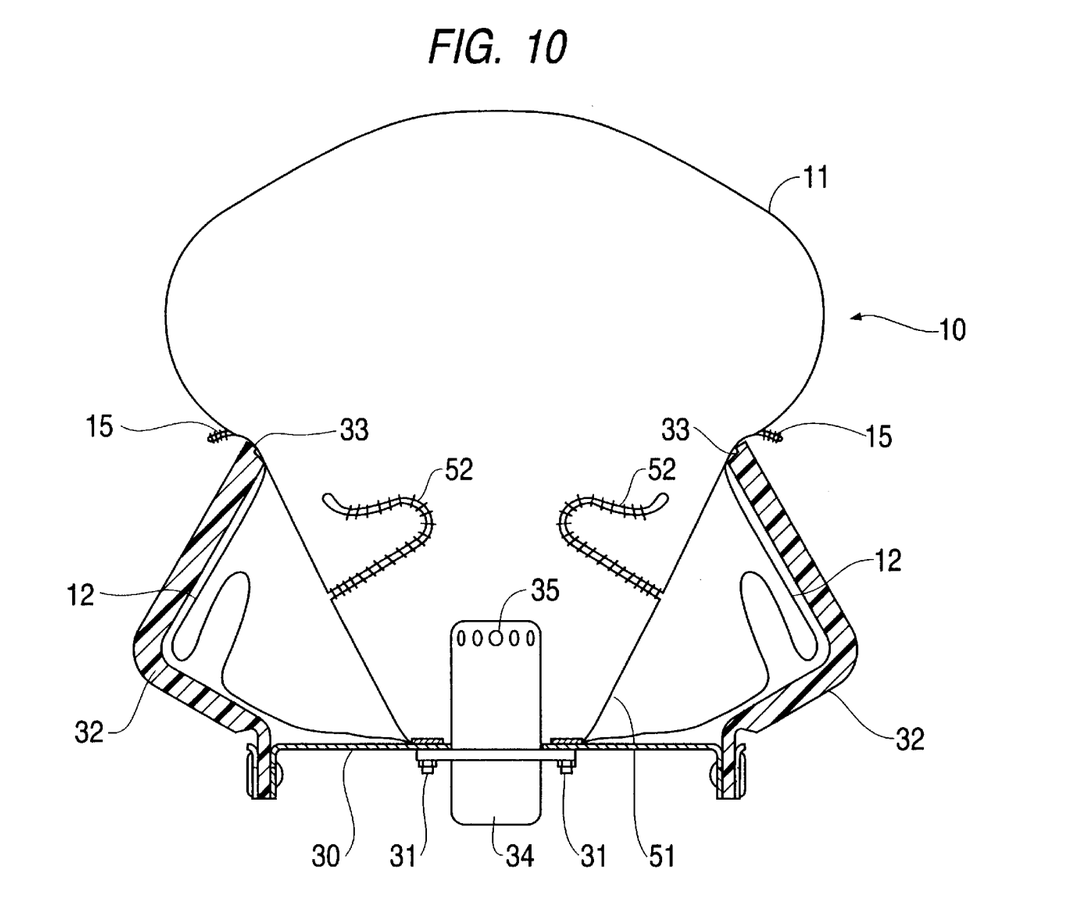
FIG. 10 is a cross sectional view showing an unfolded state of an air bag device constructed according to another embodiment of the present invention.

In the illustrated embodiment of FIG. 6 through FIG. 8, the stitched portions 13 are provided in the second panel 12 so as to reduce the rate or speed at which the second panel 12 is unfurled out of the cover 32. These stitched portions may be replaced by tethers 51 as shown in FIG. 10. In the embodiment of FIG. 10, the tethers 51 are attached at one end to the peripheral seam 15 of the first and second panels 11,12, and at the other end to the mounting 30, and each of the tethers 51 includes a stitched portion 52 formed in the middle thereof with frangible threads. The tethers 51 may be mounted outside the interior space of inflatable air bag 10, or inside the interior space of air bag 10 as shown in FIG. 10. Preferably, a plurality of tethers 51 are attached at equally spaced-apart around the peripheral seam 15 of the first and second panels 11,12. Other than the second panel 12 used in the embodiment of FIG. 10 not being provided with the stitched portions 13 as shown in FIGS. 6–8, the remaining structure of the inflatable air bag 10 of this embodiment is identical with that of the embodiment of FIGS. 6–8. It is to be understood that the manner of folding the air bag 10 is not limited to that as described above referring to FIG. 1 through FIG. 5.

FIG. 10 shows an operating state of the air bag device in which the first panel 11 is pushed out of the cover 32 under the pressure of the gas discharged from the gas outlet holes 35 of the igniter 34, and the peripheral seam 15 of the air bag device having the maximum diameter reaches the outside of the cover 32 through opening 33. In this state, the stitched portions 52 of the tethers 51 restrain the first panel 11 and the second panel 12 from popping out or immediately projecting outward. As the pressure in the air bag increases with an increase in the amount of gas discharged from the gas outlet holes 35 of the igniter 34, the frangible threads forming the stitched portions 52 are successively broken, whereby the first and second panels 11,12 are progressively unfurled to project outside the cover 32. The unfurling action of the air bag 10 is completed when all the frangible threads are broken.

Figure 11:
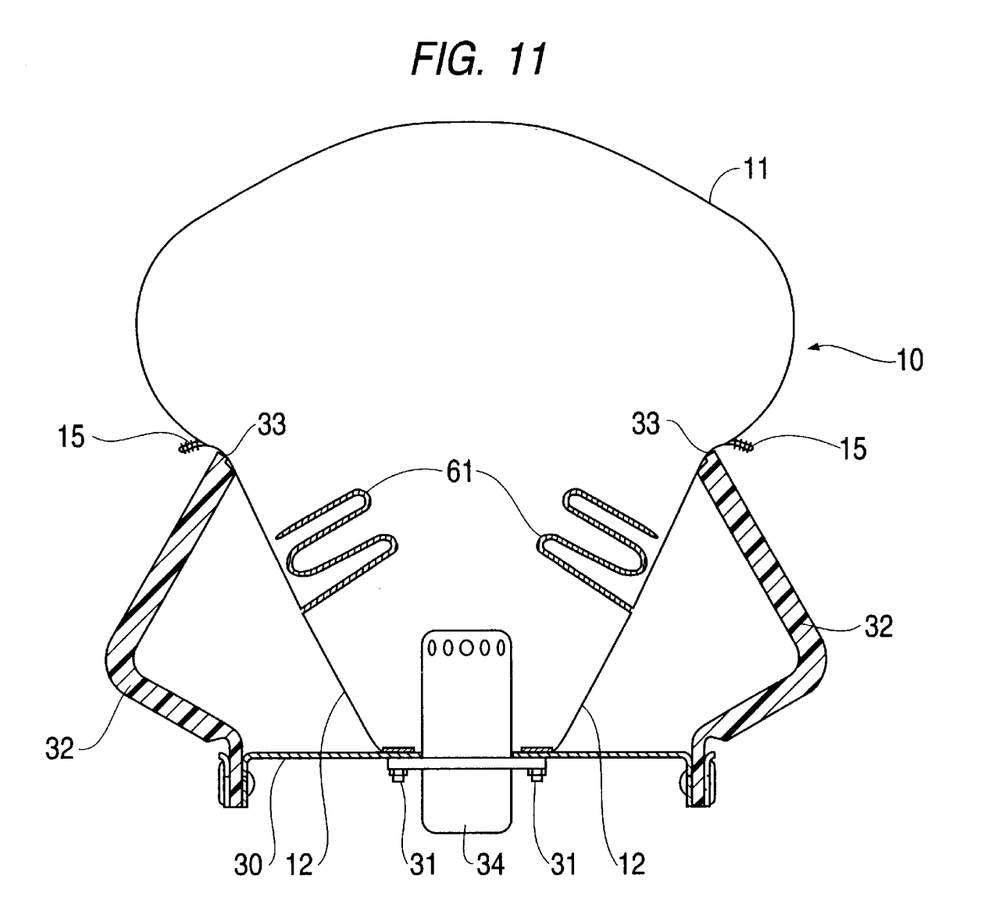
FIG. 11 is a cross sectional view showing an unfolded state of an air bag device of a further embodiment of the present invention.

FIG. 11 shows another embodiment of the present invention in which folds of the second panel 12 that are superposed on each other are bonded together to provide bonded portions 61. As disclosed in JP-A-6-298015, an adhesive used for forming the bonded portions 61 may be selected from known thermoplastic adhesives, such as a hot melt adhesive, which are fused by heat of high-temperature gas discharged from the igniter 34, and known thermosetting resin adhesives that are dissolved and degraded by application of heat. FIG. 11 shows an operating state of the thus constructed air bag 10 in which the first panel 11 is pushed out of the cover 32 by the pressure of the gas discharged from the gas outlet holes 35 of the igniter 34, and the peripheral seam 15 of the air bag 10 having the maximum diameter comes out through the opening 33 of the cover 32. In this state, the bonded portions 61 prevent the first panel 11 and the second panel 12 from immediately projecting outward. As the pressure within the air bag increases with an increase in the amount of gas discharged from the gas outlet holes 35 of the igniter 34, the bonded portions 61 gradually separate due to the heat of the gas, whereby the first and second panels 11,12 are progressively unfurled to project outside the cover 32. The unfurling action of the air bag 10 is completed when the entirety of the bonded portions 61 are separated.

In the embodiment of FIG. 11, the bonded portions 61 may be provided in the same patterns as indicated in FIGS. 9A–9F in which the stitched portions 13 are provided in the first embodiment.

The stitched portions 52 of the tethers 51 used in the embodiment of FIG. 10 may be replaced by bonded portions formed as described above.

In the air bag device constructed as described above according to the present invention, the second panel of the air bag is provided with means for modulating the unfurling action of the second panel. The stitched portions or bonded portions, for example, restrain the air bag from abruptly projecting or expanding in the lateral direction after the peripheral seam having the maximum diameter comes out of the cover. Thus, the air bag can be slowly unfolded in the lateral direction and toward the vehicle occupants, without applying strong tensile forces to local parts of the air bag. This allows the air bag to be formed from a cloth having a reduced thickness, leading to reduction in the size and weight of the air bag. Accordingly, the present air bag device can be manufactured at a reduced cost.

It is to be understood that the present invention is not limited to details of the illustrated embodiments as described above, but may be embodied with various changes or modifications which may occur to those skilled in the art.

What is claimed is:

1. An inflatable air bag for a vehicle, said air bag comprising:

a pliable first panel having a front surface and a back surface, wherein said front surface and said back surface are connected by an edge of said first panel;

a pliable second panel folded onto itself and overlaying said first panel;

a peripheral seam securing said second panel to said back surface, wherein said peripheral seam extends around said first panel proximate to said edge;

an interior space between said first panel and said second panel, wherein said interior space is delimited by said peripheral seam;

at least one frangible link spanning folds of said second panel, wherein said at least one frangible link modulates unfurling said second panel folds; and a first vent hole penetrating said second panel, wherein said first vent hole is circumscribed by one of said at least one frangible link.

2. An inflatable air bag for a vehicle as claimed in claim 1, further comprising a second vent hole penetrating said second panel.

3. An inflatable air bag for a vehicle as claimed in claim 2, wherein said second vent hole is circumscribed by another of said at least one frangible link.

4. An inflatable air bag for a vehicle, said air bag comprising:

a pliable first panel having a front surface and a back surface, wherein said front surface and said back surface are connected by an edge of said first panel;

a pliable second panel folded onto itself and overlaying said first panel;

a peripheral seam securing said second panel to said back surface, wherein said peripheral seam extends around said first panel proximate to said edge;

an interior space between said first panel and said second panel, wherein said interior space is delimited by said peripheral seam;

at least one frangible link spanning folds of said second panel; and at least one tether spanning said second panel and connected to said peripheral seam, said at least one tether is folded onto itself, wherein said at least one frangible link modulates unfurling said second panel folds, and wherein said at least one frangible link secures a plurality of said folds to one another.

5. The inflatable air bag according to claim 4, wherein said at least one frangible link secures a plurality of tether folds to one another.

6. The inflatable air bag according to claim 5, wherein said at least one frangible link includes thread.

7. The inflatable air bag according to claim 5, wherein said at least one frangible link includes adhesive.

\* \* \* \* \*